Nov. 11, 1941. W. W. COREY 2,262,356
FIRE HYDRANT, STREET LIGHT STANDARD, AND SIMILAR STRUCTURES
Filed Jan. 31, 1941

INVENTOR;
WILLIAM W. COREY
BY
ATTORNEY

Patented Nov. 11, 1941

2,262,356

UNITED STATES PATENT OFFICE 2,262,356

FIRE HYDRANT, STREET LIGHT STANDARD, AND SIMILAR STRUCTURES

William W. Corey, St. Louis, Mo., assignor to Iowa Valve Company, Des Moines, Iowa, a corporation of Iowa Application January 31, 1941, Serial No. 376,732

4 Claims. (Cl. 285—140)

This invention relates to fire hydrants, street light standards and various other structures that are intended to be installed along a roadway and which usually consist of an upright, tubular casting mounted upon and detachably connected to a flanged supporting device consisting usually of an underground cast metal pipe, or a flanged tubular part fastened to an underground pipe.

Tubular cast metal members of the kind above referred to are liable to be struck by passing traffic, and accordingly, many types and kinds of so-called "breakable connecting devices" have been devised for the purpose of securing such a flanged, tubular member to a flanged part which supports it, in such a way that if the upper member is subjected to a blow or pressure of great force, the connecting means will rupture or break, thus permitting the upright tubular member to yield or move under the impact of the blow, and consequently, preventing breakage of or injury to said upright member, or to the flanged supporting device with which the connecting devices are usually engaged.

My invention has for its main object to provide a "breakable" holding means or securing means for a fire hydrant, street light standard, or similar upright tubular member, that is inexpensive, easy to install, and of such design and construction that the tubular member will normally be held rigidly in an upright position, but will be capable of yielding or moving under an impact of great force, without liability of causing the tubular member or the part on which it is supported to be injured or broken by a strain or pressure exerted on same by some part of the breakable connecting means that exerts a strain on same. To this end I have devised a structure consisting of an upright tubular member, which, for convenience, I will refer to as an exposed element arranged above the surface of the ground, a supporting device for said upright member, which, for convenience, I will refer to as a buried element, notwithstanding the fact that the part on which the exposed element of the structure is superimposed may be located some distance above the surface of the ground, an integral flange on the exposed element or top member of the structures provided with holes down through which fastening devices extend, a co-acting flange on the supporting element or buried member of the structure provided with pockets, and frangible members engaged with said fastening devices and positioned in said pockets with laterally-projecting wings or portions on said frangible members bearing against the underside of the flange in which said frangible members are removably mounted. The flange on the supporting element of the structure is of sufficiently great area to provide an adequate bearing for the exposed element or top member of the structure, and when the fastening devices are tightened, the flange on the exposed element will be clamped tightly to the flange on the supporting element, and effectively held against rotary movement or circular movement, due to the fact that the fastening devices snugly fit holes in the flange on the exposed element, and the frangible members engaged with said fastening devices are loosely positioned in pockets in the flange on the supporting member. Preferably, the pockets above referred to are formed by open-ended slots, notches or gaps formed in the edge of the flange on the supporting member.

In the event the exposed element is subjected to a lateral blow or pressure of great force, the upward strain exerted by the fastening devices on the frangible elements by the canting action or tendency of the exposed element to tilt or rock sidewise, causes the laterally-projecting wings of the frangible elements, which lap over the underside of the slotted flange on the supporting member, to rupture at the points where said wings branch laterally from the body portions of the frangible elements positioned in the notches or slots in the supporting flange, thereby releasing the exposed element of the structure and permitting it to yield or move under the force of the blow or impact. In the above action the fastening devices remain in the flange of the exposed element, after said exposed element has tilted over, and the frangible elements associated with same become detached and disengaged from the flange on the supporting element, due, of course, to the fact that the body portions of the frangible elements with which the fastening devices are directly engaged, pull upwardly out of the slots or notches in the supporting flange, after said frangible elements fracture, and the laterally-projecting wings on said frangible elements that engage the underside of the supporting flange drop downwardly away from same, the breaking of said wings being effected by the upward force exerted on the body portions of the frangible elements positioned in the notches or slots in the supporting flange. It will thus be seen that in my improved construction the breakable connecting means that normally holds the two elements of the structure in operative relationship, will be capable of functioning properly so as to release the exposed element, without liability of any parts of the connecting means remaining in engagement with and perhaps causing injury to the flange on the supporting element, as might occur if the fastening devices became bent or twisted and remained in engagement with the supporting flange after the exposed element had canted sidewise or tilted from its normal upright position. In other words, in my improved construction the exposed element, i. e., the tubular casting of a fire hydrant, street light standard, or similar part, can rock sidewise or tilt over without causing bending of the fastening devices used to hold it normally in an upright position, due to the fact that the fastening devices are not confined in or surrounded by the flange on the supporting element of the structure, but instead, are engaged with frangible elements that are positioned in pockets, preferably open-ended notches or slots in the supporting flange, and which are capable of either moving radially out of the open ends of said notches, or rupturing and pulling upwardly out of said notches. In the foregoing description I have referred to the notched flange as being carried by or forming part of the supporting member of the structure. I wish it to be understood, however, that my invention contemplates arranging the frangible elements in pockets of any suitable shape, formed in a flange on the top member or exposed element of the structure.

Figure 1 of the drawing is a fragmentary elevational view of a structure comprising an exposed element arranged above the surface of the ground, a co-acting element buried in the ground, and a plurality of connecting devices embodying my invention, that join said two elements together.

Figure 1:
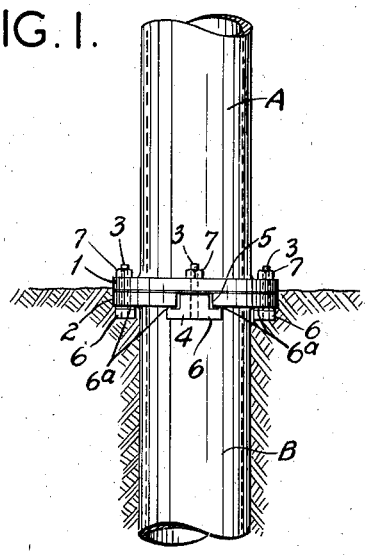
Figure 3:
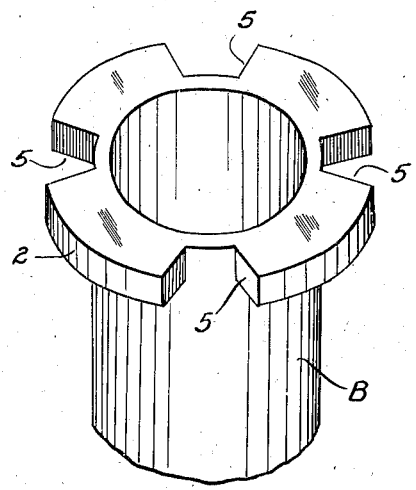
Figure 3 is a perspective view of said buried element, with the frangible members removed.
Figure 2:
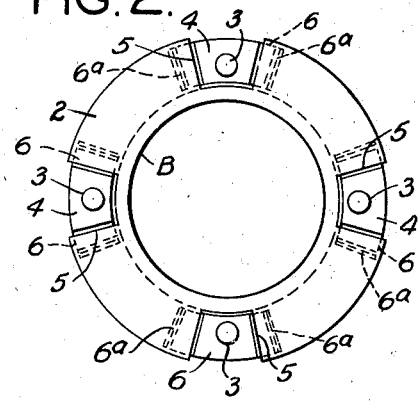
Figure 2 is a top plan view, illustrating the construction of the upper end portion of the buried element, showing the frangible members arranged in operative position in the slotted flange of said buried element.

In the drawing A designates an element or member of the kind that is adapted to be installed along a roadway and which is intended to be rigidly attached to a cooperating element B buried in the ground. For example, the exposed element A may consist of a fire hydrant, street light standard, or similar part, usually of tubular construction, and the buried element B may consist of an underground water main, electric wire conduit, or equivalent part that acts as a support for the exposed element A, and which must be maintained in a definite relationship with said exposed element. Co-acting elements of the kind referred to are usually joined together, by bolts, studs, or similar fastening devices that pass through integral co-acting flanges 1 and 2 on the elements A and B, respectively, and the main object of my invention is to provide an improved means for joining or connecting the two elements A and B of such a structure, in such a manner that if the exposed element A is subjected to an abnormal blow or shock, it will yield, move, or give sufficiently under the impact to prevent rupture or breakage of one or the other of the flanges 1 and 2.

To this end I have devised a novel connecting means for the purpose described, that comprises a stud, bolt, or screw 3 attached to or combined with a frangible member 4. The shank part 3 of said connecting means is intended to be inserted in a hole in a flange on one of the elements of the structure, and the frangible member 4 is intended to be arranged in an open-ended slot or notch in the co-acting flange on the other element of the structure, with a portion or portions of said frangible member lapping over said slotted flange, as shown in Figure 1.

Figure 4:
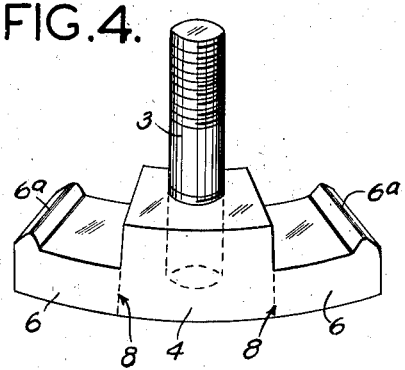
Figure 4 is a perspective view of one of the frangible members.

In the preferred form of my invention, herein shown, the exposed element A is provided at its lower end with an integral, laterally-projecting flange 1 of conventional construction, and the buried element B, which is arranged in longitudinal alignment with the element A, is provided at its upper end with an integral, laterally-projecting flange 2 that bears against the flange 1. As shown in the drawing, the flange 2 has a plurality of radially-disposed, open-ended gaps, slots or notches 5 formed in same to receive the frangible members 4, previously referred to. In the operation of joining or connecting the two elements A and B of the structure, a plurality of frangible members 4 of the kind shown in Figure 4 are positioned in the notches or gaps 5 in the flange 2, with one or more integral portions 6 on said frangible members bearing against the underside of the flange 2.

Figure 5:
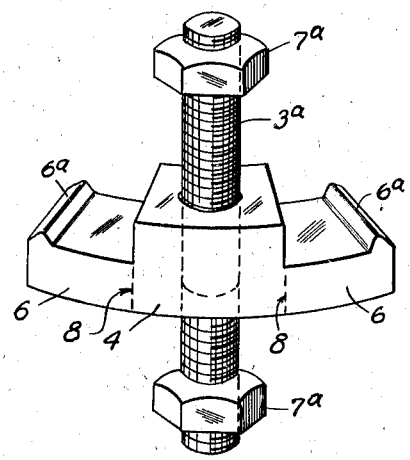
Figure 5 is a perspective view, illustrating how bolts may be used instead of studs, for holding the frangible members in engagement with the slotted flange on one element of the structure.

Any suitable type or kind of adjustable fastening devices may be used to exert an endwise thrust on the frangible members 4 in a direction to cause said frangible members to draw the flange 2 of the buried element B and the flange 1 of the exposed element A into tight engagement with each other. In the form of my invention shown in Figure 4, the body portion of the frangible member 4 is rigidly attached in any suitable way to a screw-threaded stud 3 that is adapted to project upwardly through a hole in the flange 1 of the element A, so as to receive a nut 7 that bears against the top face of the flange 1. When the nuts 7 on the shanks 3 of the frangible members 4 are tightened, the two opposed elements A and B of the structure will be drawn into tight engagement with each other. In the form of my invention shown in Figure 5, the frangible member 4, instead of having a screw-threaded stud rigidly attached to same, is provided with an unthreaded hole for receiving a bolt $3^a$ equipped with threaded portions for receiving nuts $7^a$.

Usually, the frangible member 4 will be formed from cast metal and provided with a pair of integral, laterally-projecting ears or wings 6. In order to insure that the frangible members 4 of the structure will be sure to rupture, under a violent blow or shock exerted on the exposed element A, said frangible members are preferably so designed or constructed that the operation of tightening the nuts 7 or $7^a$ imposes a strain or sets up tension in the frangible members 4, preferably at the points where the laterally-projecting wings or ears 6 of said members merge into the body portions of said members. Thus, as shown in Figures 1 and 4, the laterally-projecting wings or ears 6 of each frangible member 4 may be provided on their upper sides, at or near their terminal ends, with ribs or projections $6^a$ that bear against the underside of the flange 2 of the buried element B, and thus prevent the wings 6 from bearing throughout their entire area on said flange. Consequently, when the nuts on the studs or bolts 3 or 3ª are tightened, tension will be set up in the frangible members 4 at the points indicated by the dotted lines in Figure 4, designated by the reference character 8, which points 8 constitute zones of reduced strength that are intended to rupture, thus leaving the body portions of the frangible members engaged with the studs or bolts, to pull upwardly through the notches in the supporting flange or move outwardly through the open ends of said notches when the exposed element tilts sidewise. The ribs or projections 6ª are not essential, however, and may be omitted, if desired.

While I prefer to provide the frangible members 4 with body portions that are positioned in radially-disposed slots or gaps in a flange on one of the two objects or elements connected together, and provide each of said body portions with a pair of integral, laterally-projecting wings that have an uneven or eccentric bearing on the flanges which they overlap, I wish it to be understood that the particular shape or form of the frangible members of the structure may be varied without departing from the spirit of my invention, which, in its broadest aspect, consists in joining two flanged, superimposed objects together by a breakable connecting means comprising frangible members positioned in open-ended slots in the flange on the bottom object and arranged in overlapping relation with the underside of said flange, and adjustable fastening devices engaged with said frangible members and with the flange on the top object for drawing said objects towards each other. Irrespective of whether or not the laterally-projecting portions 6 of the frangible members have an even or uneven bearing on the flange which they engage, the operation of setting up the nuts 7 or 7ª, causes strains or excess tension to be set up in one or more portions of the frangible members, thereby insuring breakage of the laterally projecting wings on the frangible members 4 in the event the top object A is subjected to an abnormal lateral blow or shock. To repair the structure it is only necessary to remove the frangible members that have ruptured and replace them with perfect frangible members. The above described method of attaching a fire hydrant, street light standard, or similar element to an underground part that supports it, or with which it co-operates, is desirable, on account of the ease and rapidity with which such a structure can be repaired in the event the exposed element is knocked over by a blow from passing traffic, and it has the added advantage of being inexpensive and highly reliable in operation, inasmuch as there is no liability of the fastening devices 3, 3ª, or the frangible members 4 remaining in engagement with the flange on the supporting element, and thus perhaps exerting strains on said flange that result in breakage of said flange, when the exposed element A topples over under the force of a blow.

Having thus described my invention, what I claim as new and desire to secure by Letters Patent is:

1. A means for connecting or joining two flanged objects, one of which is intended to move or yield when subjected to a violent lateral shock or blow, comprising a removable, frangible member removably positioned in a pocket in a flange on one of said objects and provided with an integral portion that laps over and clampingly engages said pocketed flange, and an adjustable means engaged with said frangible member and extending through the flange on the other object for drawing said object towards each other.

2. A means for connecting or joining two superimposed, flanged objects, the top one of which is intended to move or yield when subjected to a violent lateral shock or blow, comprising a plurality of frangible members positioned in open-ended notches in the flange on one of said objects and provided with integral portions that lap over and clampingly engage said notched flange, and adjustable fastening devices engaged with said frangible members and projecting through the flange on the other object for drawing said objects towards each other, said frangible members being so arranged or constructed that the operation of tightening said fastening devices sets up tension or produces strains in said frangible members at points where said members are intended to break under certain conditions.

3. A highway accessory, comprising a substantially tubular-shaped element arranged in an upright position above the surface of the ground, a supporting member on which said upright element is positioned, co-acting flanges on said element and member, the flange on the supporting member being provided with pockets, threaded fastening devices passing through holes in the flange on the upright element, frangible members combined with said fastening devices and arranged in the pockets in the flange on the supporting member, and integral, laterally-projecting, breakable portions on said frangible members that bear against the underside of the flange on the supporting member.

4. In a highway accessory, the combination of a top member arranged above the surface of the ground and provided at its lower end with an integral flange, a bottom member provided with a flange on which said top member is supported, said supporting flange having open-ended notches, gaps or slots in the edge of same, frangible elements having body portions positioned in the notches in said supporting flange, fastening devices projecting downwardly through the flange on said top member and engaged with the body portions of said frangible elements, and integral, laterally-projecting wings on said body portions clampingly engaged with said notched flange and adapted to rupture at the points where they branch laterally from said body portions, in the event said top member is submitted to a lateral blow of great force.

WILLIAM W. COREY.